(12) United States Patent
Nijland et al.

(10) Patent No.: US 10,906,069 B2
(45) Date of Patent: Feb. 2, 2021

(54) PACKAGING DEVICE AND SORTING SYSTEM FOR DIRECTIONAL PACKAGING OF PRODUCTS AND METHOD THEREFOR

(71) Applicant: DE GREEF'S WAGEN-, CARROSSERIE- EN MACHINEBOUW B.V, Tricht (NL)

(72) Inventors: Wilhelm Jan Nijland, Tricht (NL); Dirk Gijsbertus Peters, Tricht (NL); Tycho Marinus Hartman, Tricht (NL)

(73) Assignee: DE GREEF'S WAGEN-, CARROSSERIE- EN MACHINEBOUW B.V, Tricht (NL)

( * ) Notice: Subject to any disclaimer, the term of this patent is extended or adjusted under 35 U.S.C. 154(b) by 132 days.

(21) Appl. No.: 16/081,839

(22) PCT Filed: Feb. 2, 2017

(86) PCT No.: PCT/NL2017/050070
§ 371 (c)(1),
(2) Date: Aug. 31, 2018

(87) PCT Pub. No.: WO2017/150968
PCT Pub. Date: Sep. 8, 2017

(65) Prior Publication Data
US 2019/0076883 A1 Mar. 14, 2019

(30) Foreign Application Priority Data
Mar. 4, 2016 (NL) ...................................... 2016363

(51) Int. Cl.
*B07C 5/342* (2006.01)
*B07C 5/38* (2006.01)
(Continued)

(52) U.S. Cl.
CPC .............. *B07C 5/3422* (2013.01); *B07C 5/38* (2013.01); *B25J 9/0093* (2013.01);
(Continued)

(58) Field of Classification Search
CPC ......... B07C 5/342; B07C 5/3422; B07C 5/38; B65B 5/105; B65B 5/12; B65B 35/08; B65B 43/54
See application file for complete search history.

(56) References Cited

U.S. PATENT DOCUMENTS

| | | | | |
|---|---|---|---|---|
| 3,410,050 A | * | 11/1968 | Bell | ........................ B65B 5/105 53/538 |
| 4,976,582 A | * | 12/1990 | Clavel | .................... B25J 9/1065 108/138 |
| 2014/0157732 A1 | * | 6/2014 | Gasber | ...................... B65B 5/12 53/473 |

FOREIGN PATENT DOCUMENTS

| | | | | |
|---|---|---|---|---|
| CA | 3016517 A1 | * | 2/2017 | ........... B07C 5/3422 |
| CA | 3016517 A1 | * | 9/2017 | ............. G01N 21/00 |

(Continued)

OTHER PUBLICATIONS

International Search Report and Written Opinion dated Jul. 13, 2017 in International Patent Application No. PCT/NL2017/050070, 21 pages.

*Primary Examiner* — Terrell H Matthews
(74) *Attorney, Agent, or Firm* — Shook, Hardy & Bacon L.L.P.

(57) ABSTRACT

The present invention relates to a packaging device and sorting system (82) for directional packaging of products (P), such as vegetables and fruit, and a method therefore. The packaging device according to the invention comprises: —a sensor system (54) configured to detect a collection of suitable pick-up points; —at least one directing unit (16) configured to direct a product and provided with at least one
(Continued)

Figure 1:
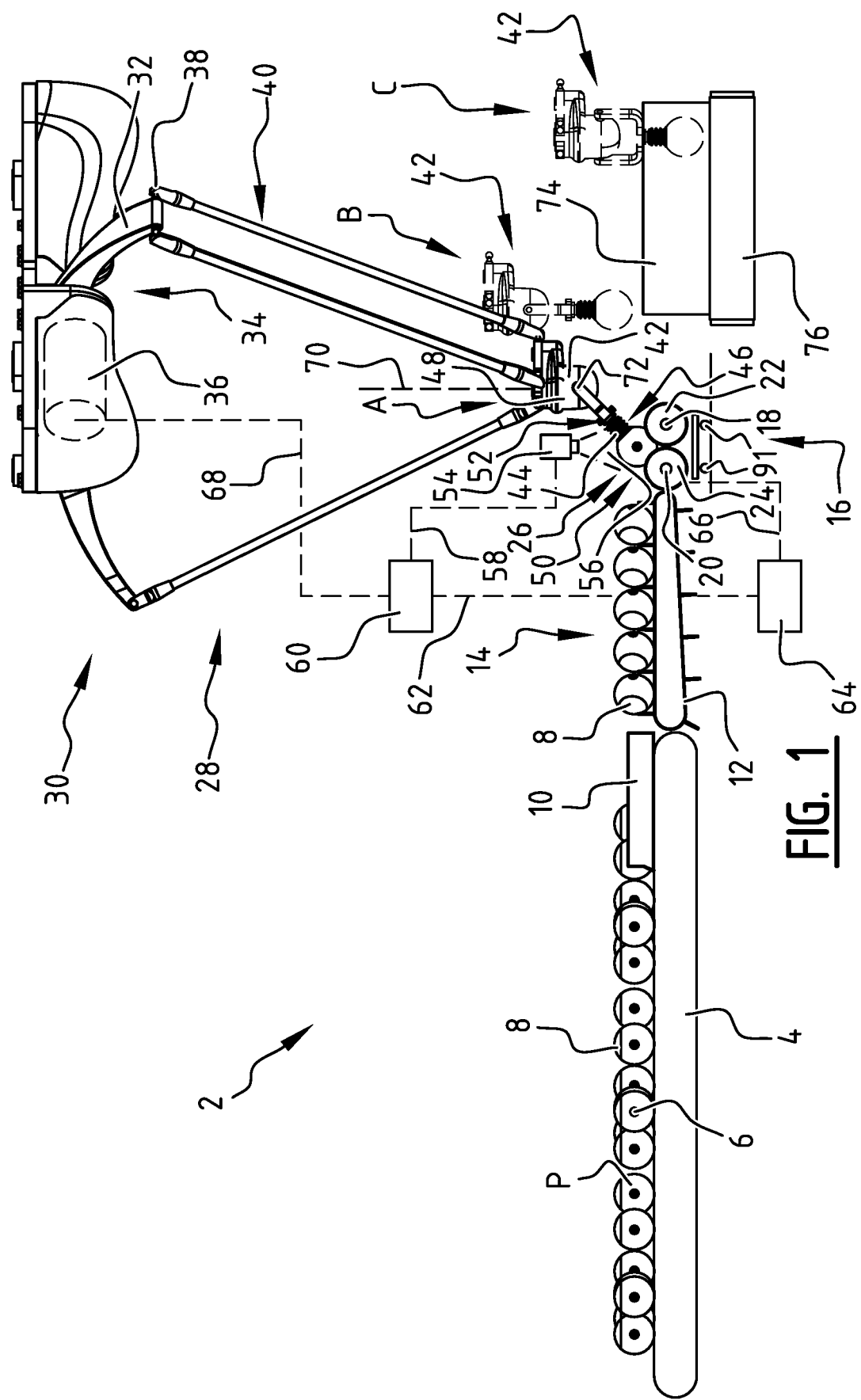

degree of freedom for rotation of the product around a substantially horizontal rotation axis; and —a manipulator (28) comprising: —a pick-up element (44); and —a moving device (30) comprising at least four degrees of freedom for translation of the product and rotation around a substantially horizontal axis, wherein a rotation of the product around a substantially vertical rotation axis is possibly by means of providing the moving device and/or directing unit with an additional degree of freedom.

20 Claims, 5 Drawing Sheets

(51) Int. Cl.
| | | |
|---|---|---|
| *G01N 21/00* | (2006.01) | |
| *B65B 25/04* | (2006.01) | |
| *B65B 35/58* | (2006.01) | |
| *B25J 15/06* | (2006.01) | |
| *B25J 9/00* | (2006.01) | |
| *B25J 19/02* | (2006.01) | |
| *B65B 35/18* | (2006.01) | |
| *B65B 35/08* | (2006.01) | |
| *B65B 43/54* | (2006.01) | |
| *B65B 57/08* | (2006.01) | |
| *B65B 5/10* | (2006.01) | |
| *B65B 5/12* | (2006.01) | |

(52) U.S. Cl.
CPC ......... *B25J 15/0683* (2013.01); *B25J 19/023* (2013.01); *B65B 25/046* (2013.01); *B65B 35/18* (2013.01); *B65B 35/58* (2013.01); *G01N 21/00* (2013.01); *B07C 2501/009* (2013.01); *B07C 2501/0063* (2013.01); *B07C 2501/0081* (2013.01); *B65B 5/105* (2013.01); *B65B 5/12* (2013.01); *B65B 35/08* (2013.01); *B65B 43/54* (2013.01); *B65B 57/08* (2013.01)

(56) References Cited

FOREIGN PATENT DOCUMENTS

| | | | |
|---|---|---|---|
| DE | 102006003859 B3 | 3/2007 | |
| EP | 0250470 A1 | 1/1988 | |
| EP | 0250470 A1 * | 1/1988 | ............ B25J 9/1065 |
| EP | 0644120 A1 | 3/1995 | |
| EP | 0727355 A1 * | 2/1996 | ............ B25J 9/1697 |
| EP | 0727355 A1 * | 8/1996 | ............ B25J 9/1697 |
| EP | 0727355 A1 | 8/1996 | |
| EP | 1183197 A1 | 3/2002 | |
| NL | 1034208 C1 | 2/2008 | |
| NL | 2002866 C2 * | 5/2009 | ........... B07C 5/3422 |
| NL | 2002866 C | 11/2010 | |
| WO | WO-9924333 A1 * | 11/1998 | ......... B65G 47/1471 |
| WO | WO-9924333 A1 * | 5/1999 | ............ B65G 47/256 |
| WO | 01/22043 A2 | 3/2001 | |
| WO | WO-2006015459 A1 * | 7/2005 | ............. A23N 15/00 |
| WO | WO-2006062401 A1 * | 12/2005 | ............. B65G 47/24 |
| WO | WO-2006015459 A1 * | 2/2006 | ............. A23N 15/00 |
| WO | WO-2006062401 A1 * | 6/2006 | ............. B65B 25/04 |
| WO | WO-2007144799 A2 * | 5/2007 | ............. B65B 25/04 |
| WO | 2007/144799 A2 | 12/2007 | |
| WO | WO-2007144799 A2 * | 12/2007 | ............. B65B 35/58 |
| WO | 2008148177 A2 | 12/2008 | |

* cited by examiner

PACKAGING DEVICE AND SORTING SYSTEM FOR DIRECTIONAL PACKAGING OF PRODUCTS AND METHOD THEREFOR

CROSS-REFERENCE TO RELATED APPLICATIONS

This application claims priority under 35 U.S.C. § 365 to PCT/NL2017/050070, filed on Feb. 2, 2017, entitled "PACKAGING DEVICE AND SORTING SYSTEM FOR DIRECTIONAL PACKAGING OF PRODUCTS AND METHOD THEREFOR," which claims priority to Netherlands App. No. 2016363 filed on Mar. 4, 2016, the entirety of the aforementioned applications are incorporated by reference herein.

The present invention relates to a packaging device whereby products, such as vegetables and fruit, including apples, peaches and tomatoes, and other food products such as sweets and other confectionery, can be placed in a packaging or container in directional manner. Directional packaging relates here to placing of the products in a packaging with a desired orientation.

The demand in practice is for products to be placed in packagings or containers, including boxes and trays, with a specific spatial orientation and positioning in order to thereby present the product to the consumer in a visually attractive manner. Apples are thus for instance usually placed with the calyx-stalk axes in a substantially horizontal plane, pointing in the same direction as the other products in the packaging. In the case that the apples have a bloom, i.e. an additional red discoloration on one side, this bloom is usually placed in the packaging facing upward. In practice such directional packaging of products is largely manual labour, which entails extra costs. Additional operations are hereby also performed on the product, which increases the risk of damage to these products.

NL 2002866 describes a directing device and packaging device provided therewith, wherein the directing device is provided with a supply and discharge of the products to and from a position where it can lie, wherein the lying position is formed by at least three rotatable contact elements, each individually provided with a rotation shaft, such that the contact elements are rotatable. Driving the contact elements individually enables products to be oriented in desired manner before positioning of the product, such that this product can be picked up at the desired position. For placing of the product in the packaging the contact elements are driven or conversely held stationary in coordinated manner. Some processing time is required for this purpose.

The present invention has for its object to provide a packaging device which enables efficient directional packaging of a product and which at least reduces one or more of the above stated drawbacks, such as additional operations, risk of damage to the product and required processing time.

This object is achieved with a packaging device for directional packaging of products, such as vegetables and fruit, according to the invention, wherein the packaging device comprises:
 a sensor system configured to detect a collection of suitable pick-up points of a product for packaging;
 at least one directing unit operatively connected to the sensor system and configured to direct a product such that at least one suitable pick-up point lies in an operating range of the manipulator, and wherein the directing unit is provided with at least one degree of freedom for rotation of the product around a substantially horizontal rotation axis; and
 a manipulator comprising:
  a pick-up element configured to pick the product up from the directing unit; and
  a moving device, on or close to an outer end of which the pick-up element is arranged and which comprises at least four degrees of freedom for translation of the product and rotation around a substantially horizontal rotation axis,
 wherein a rotation of the product around a substantially vertical rotation axis is possible by providing the moving device with at least five degrees of freedom and/or providing the directing unit with a second degree of freedom, such that the moving device can pick up the product and place it in a packaging or container in a desired orientation.

By means of for instance a feed conveyor, products are supplied to a directing unit of the packaging device which is operatively connected to the conveyor. At the desired position or positions of the directing unit a collection of suitable pick-up points is detected for a product for packaging using a sensor system.

A pick-up point is defined as a point or location on the product where the manipulator can pick up the product. A suitable pick-up point is a point on the product for which it has been determined that a manipulator can pick up the product here such that the product is processed in desired manner.

The most suitable pick-up point of the collection of suitable pick-up points is more particularly preferably determined using the sensor system. The product is directed, particularly rotated, with the directing unit such that at least one of the suitable pick-up points, and preferably the most suitable pick-up point, is brought into the operating range of the manipulator, this meaning that the manipulator is able to pick up the relevant product at this suitable pick-up point. In the packaging device according to the invention a manipulator is provided with a pick-up element for picking up the product from the directing unit, which picks up the products and can place them in the packaging or container, such as a box or tray or crate, with the desired orientation. The manipulator can if desired be provided with a plurality of pick-up elements, for instance two, three or four. It is also possible to provide a plurality of manipulators per directing unit or to provide a plurality of directing units per manipulator.

Bringing one of the suitable pick-up points of the product into the operating range of the manipulator, particularly positioning the product such that the manipulator can pick up the product quickly and correctly, simplifies both the directing process and the pick-up process. This increases the processing speed and/or reduces the risk of malfunctions relative to conventional systems. This is because a complex positioning of the product prior to picking up is no longer required. In addition, it is possible to limit the complexity of the directing unit, certainly compared to said conventional systems.

The products for directing are preferably vegetables and fruit, and potatoes. The products are preferably products which are somewhat round, such as apples, pears, peaches, tomatoes and exotic products which require directional packaging, i.e. have to be placed in a packaging or container with identical orientation. It is for instance usually desired to have the stalks point in the same direction in a packaging. In the case of for instance apples, the blooms are further preferably oriented identically in the packaging. It is further possible according to the invention to take into account a spread in product dimensions. A desired position in the packaging can thus for instance be determined subject to the product dimensions. This can for instance prevent large products coming to lie close together and adjacent products being damaged during positioning. This preserves the product quality and avoids possible damage. It is also possible to employ the packaging device according to the invention in the packaging of other food products, such as sweets and other confectionery, and other products.

The packaging or container relates to a large number of possible packagings, such as cardboard boxes, wooden crates, barrels of synthetic material, plastic tubs, packing trays with preformed recesses of synthetic material, cardboard, paper pulp, and further possible packagings and packaging materials. An example of a packing tray is a honeycomb pattern of for instance 7 spaces horizontally and 5 vertically.

The directing unit is further preferably used to enable the sensor system to perform measurements on the product which make it possible to determine positions of a stalk, calyx and bloom, as well as where possible other characteristics of the product are oriented. A collection of suitable pick-up points can then be defined from these measurements, and a preferably minimal movement of the product can place this product on the directing unit in the desired manner, suitable for picking up with the manipulator. Operations with the product hereby remain limited, whereby damage to these products is prevented. In addition, it is possible to have the sensor system perform an (additional) quality control. Unsuitable products are hereby selected and not placed in the intended packaging.

The sensor system comprises for instance a camera system and/or one or more other sensors, such as sensors for measuring on the basis of diverse wavelengths, for instance UV, IR and/or visible light. It is also possible to make use of sensors which apply ultrasonic vibrations during measuring. It is also possible to apply multiple types of sensor.

In a currently preferred embodiment the sensor system comprises a camera system. It has been found that the position of a stalk, calyx, bloom or other characteristic of the product can be determined in effective manner with such a camera system. A plurality of recordings is preferably made over time while the product moves, whereby an overall view of the surface of the product is obtained. A collection of suitable pick-up points can then be determined with this overall view. The sensor system is preferably provided for this purpose with a processing unit configured to process information obtained about the product, and to determine the collection of suitable pick-up points. In a currently preferred embodiment one (or more) quality aspects are here determined by the sensor system. It is hereby possible to determine the desired next processing step for the relevant product. This relates for instance to separately discharging a product of insufficient quality and/or determining an intended set-down position for the product in the packaging or container.

In one of the currently preferred embodiments according to the invention the sensor system is also configured to:
detect the state, position and/or orientation of the packaging or container or a part thereof, and/or
detect the possible set-down positions in the packaging or container, and/or
detect the available set-down positions in the packaging or container, and/or
detect the state, position and/or orientation of recently set-down products in the packaging or container, and/or
check the completely filled packaging or container after it has been filled.

The sensor system can be provided with additional sensors or detectors for performing these steps or tasks. Providing the sensor system with a processing unit makes it possible to thereby process the obtained information and, for instance on the basis thereof, send signals to other components of the packaging device or other parts of the packaging line. An effective packaging process for the products is hereby realized. An alarm or alert is preferably realized in the case of an error or sub-optimal setting down/positioning of a product in the packaging or container. If desired, a corrective operation can follow, for instance performed by the manipulator. A packaging or container can hereby further be prevented from leaving the packaging device with empty product positions. It is also possible to perform a check as to whether an intended set-down position is indeed available and is not occupied already by another product. Impacts and possible product damage are hereby prevented.

In addition to a pick-up element, the manipulator comprises a moving device comprising at least four degrees of freedom, such that after being picked up the product can be displaced from the directing unit to the packaging and can be oriented according to the desired position in such a packaging. The manipulator can here perform a translation of the product in the space, i.e. a displacement along so-called X, Y and Z-axes. The manipulator can also perform a rotation around a substantially horizontal rotation axis.

In a first and currently preferred embodiment according to the invention the directing unit has available (preferably precisely) one degree of freedom to enable rotation of the product around a substantially horizontal rotation axis. A rotation around a substantially vertical rotation axis can be realized in the manipulator, which therefore has available at least 5 degrees of freedom in this embodiment.

In an alternative embodiment according to the invention the rotation of the product around a substantially horizontal and a substantially vertical rotation axis is realized by providing the directing unit with (preferably precisely) two degrees of freedom. This means that the directing unit can rotate a product around a substantially horizontal and a substantially vertical rotation axis. In this embodiment the manipulator has available at least 4 degrees of freedom for translation of the product and rotation of the product around a substantially horizontal rotation axis.

According to the invention, the manipulator is provided with a considerable number of degrees of freedom, particularly at least four or, in other currently preferred embodiment, at least five, in order to orient the product with the manipulator. The directing unit therefore functions substantially to position at least one of the suitable pick-up points in the operating range of the manipulator, in a currently preferred embodiment corresponding to the upper hemisphere, particularly the upper hemisphere of the product lying on the directing unit, this in a manner such that the pick-up element of a manipulator can reach such a pick-up point. The movements which have to be carried out by the manipulator in order to pick up the product and then position it in the packaging in directional manner are determined with the information obtained about the product.

Providing the manipulator with at least five degrees of freedom enables an orientation of a product with this manipulator. In a currently preferred embodiment the manipulator is movable for this purpose in a three-dimensional space, as already elucidated above along so-called X-Y-Z axes, i.e. in a horizontal plane and in height direction. The manipulator is in addition rotatable around two rotation axes, in the currently preferred embodiment a substantially vertically extending rotation axis and a substantially horizontally extending rotation axis.

It will be apparent that other configurations of a manipulator with at least five degrees of freedom are also possible.

It is thus possible to move the packaging or container in co-action with the pick-up element, for instance in a substantially vertical direction, such that with the joint movement of the pick-up elements and packaging at least five degrees of freedom are also (indirectly) obtained for the purpose of placing the product in the packaging or container in effective and directional manner. The packaging device is further preferably provided with an automatic feed and discharge system for the packaging or containers. An efficient packaging process can hereby be provided.

It has been found that the embodiment in which the at least 5 degrees of freedom, i.e. movement along X-Y-Z axes and around two rotation axes, are combined in the manipulator is currently preferred. In this embodiment a high processing speed on the packaging line can be realized for the intended products. This maximizes the capacity of the packaging line, resulting in an effective packaging process.

An advantage of the packaging device according to the invention is that after the measurement has been performed with the sensor system, the product need only be positioned by the directing unit to limited extent, since only one of the suitable pick-up points need be carried into the upper hemisphere. The product can then be picked up with the manipulator and be provided with the correct orientation by the manipulator. A considerable time reduction is hereby realized. A conventional directing unit applied for directional packaging of products can thus for instance require a period of time of about 5 to 10 seconds per product. Having the manipulator perform the orientation of the product for the purpose of directional packaging can achieve the same in a period of time of for instance 1 to 2 seconds in a device which is otherwise identical. It will be apparent that this considerable reduction in required time considerably increases the capacity of a whole packaging line, which reduces packaging costs. In addition, a greater efficiency is obtained in that the same capacity can be realized with fewer directing units.

In an advantageous preferred embodiment according to the present invention the at least one directing unit is provided with precisely one degree of freedom for rotation of the product, wherein the product can move around a rotation axis.

By providing the at least one directing unit with precisely one degree of freedom for directing, the directing unit can take a relatively simple form. The directing unit can hereby more specifically take a relatively simple form compared to more complex conventional directing units. Because the orientation of the product for the purpose of the directional packaging is performed by the manipulator to significant extent, it is further possible to suffice with rotating the product around a rotation axis such that at least one suitable pick-up point of the collection of pick-up points has been brought into an upper hemisphere, or at least into an operating range of the manipulator. In addition to a significant reduction in the time required for positioning of the product on the directing unit, so-called abrasion damage is further avoided. Such abrasion damage can result in vulnerable products when they rotate along a contact element which is stationary or moves at a different speed. Such abrasion damage has an adverse effect on the quality of the product. Certainly in the case of products which do not have an optimal round form, i.e. products having an irregular form, such as natural products such as vegetables and fruit, it has been found readily possible in practice to move these products on the directing unit around a rotation axis most suitable therefor, while movements in other directions result in additional impacts of the product with the directing unit, particularly contact elements thereof, which can result in impact damage to these products. This damage also has an adverse effect on the quality of the products. The packaging device according to the present invention with the limited freedoms of movement in the directing unit in combination with the at least five degrees of freedom of the manipulator is therefore able to avoid a reduction in quality during the directional packaging of the products.

In a currently preferred embodiment the directing unit comprises two diabolos which together carry the product and can if desired rotate around a rotation shaft extending substantially in a horizontal direction. The products are here preferably placed on the directing unit by a dispensing unit per pair of two diabolos. In other words, the products are preferably placed alternatingly on the series of diabolos and a product is consequently in each case placed followed by a vacant position. This enables an even better controlled directing process.

A further particular advantage of the packaging device according to the invention is that other patterns for a directional packaging are also possible. It is thus for instance possible by means of the manipulator to place the products in the packaging with the bloom facing alternately upward and downward and thereby obtain a kind of checkerboard pattern in the packaging. It will be apparent that other patterns with such a bloom can also be realized in the packaging, including company logos, product identification symbols and the like. It is also possible to vary the calyx-stalk axis in the packaging in controlled manner, optionally in combination with variations in the direction of the bloom. Further visual effects can hereby be presented to the consumer with the directional packaging. It is also possible to combine different products in a packaging, for instance a row of apples and a row of oranges in a single packaging.

According to the embodiment according to the invention, the pick-up element is provided with pressure means configured to provide an underpressure, such that the product can be picked up. This is for instance done with one or more suction cups.

Although in an alternative embodiment a product can also be picked up by the manipulator in the packaging device according to the invention using a mechanical gripper mechanism, for instance in the form of a mechanical gripper, it is currently preferred to make use of a pick-up element provided with pressure means for providing an underpressure, also referred to in practice as a vacuum. It has been found that a product can hereby be picked up and displaced in effective manner.

The pick-up element is preferably configured to perform one or more further tasks, such as:
  picking the product up from the directing unit using the pick-up element, and/or
  cleaning, brushing clean, blowing clean with compressed air and/or cleaning with another method of components of the packaging device using the pick-up element, and/or
  picking up, manipulating and/or positioning a packaging or container, and/or a component of a packaging or container, using the pick-up element, and/or
  providing the product with wax or another coating using the pick-up element.

This further increases the effectiveness of the pick-up element in particular. In addition to blowing and/or brushing clean of the products, it is also possible to displace a plurality of products simultaneously using the manipulator. A plurality of pick-up elements can for instance be provided for this purpose for a single manipulator. This can further increase the efficiency.

The pick-up element is preferably provided with a product detector configured to determine the grip of the pick-up element on the product. Such a detector measures for instance the underpressure in the pick-up element so that it can be determined on the one hand whether a product is being held at that moment, and on the other hand how firmly the product is being held. The speed of movement of the manipulator can thus for instance be increased if it is determined that a product is being held firmly, whereby the capacity of the whole packaging device can likewise be increased. Conversely, the speed of movement can be somewhat reduced in the case of for instance a highly vulnerable or irregularly formed product in order to prevent products being released by the pick-up element during the movement of the manipulator.

The pick-up element is further preferably provided with a stabilizing element, for instance in the form of a stop or stabilizer, and configured to additionally support the picked-up product during movement thereof with the pick-up element. By providing an underpressure, referred to as vacuum, the product is as it were suctioned up by the pick-up element and will here move toward the pick-up element to some extent. During the subsequent movement of the manipulator a force is exerted on the product in the pick-up element. Providing an additional stop or stabilizer which functions as additional support ensures that the product in the pick-up element remains stable and safe. Such a stop can be embodied as one or more cam elements, a ring on the periphery of the pick-up element, and edge, or can be formed in an otherwise suitable manner. A stabilizer avoids "swinging" of the products. The design of the stabilizer is adapted thereto so that product damage occurring during stabilization is avoided. The quality of the product is hereby preserved.

Providing the stabilizing element preferably with an above described stop element, which is configured such that when the product is picked up the pressure means, particularly the vacuum means or suction cup, move inward against the stop element, achieves that the product can be displaced in a more stable manner. This prevents product damage and/or increases the processing speed.

In a further advantageous preferred embodiment according to the present invention the packaging device further comprises a displacing device for providing for a relative displacement or movement between a measuring position where the product can be measured with the sensor system and a pick-up position where the product can be picked up by the manipulator.

Providing a displacing device achieves that the product for picking up can be picked up from the directing unit in effective manner by the pick-up element of a manipulator without the sensor system being inhibited here or the sensor system as it were impeding the manipulator when the product is being picked up. The speed of the processing of the product with the manipulator can be further increased by providing such a displacing device. It is possible here to displace the directing unit over some distance or conversely displace the sensor system over some distance, or to provide a combined movement. In a currently preferred embodiment the required distance amounts to about 20-30 cm. Because of this relatively limited distance, the pick-up element of the manipulator can be given access in a very short period of time and in suitable manner to the product to be picked up from the directing unit. It will be apparent that other distances are also possible, also depending on the configuration of the packaging device according to the invention.

The displacing device can be provided in diverse embodiments, for instance by displacing the directing unit using a guide or by enabling a continuous movement of products with an endless series of directing elements, for instance in the form of a chain. It will be apparent that other embodiments are also possible.

In a currently preferred embodiment an endless series of directing units is applied, which is for instance advanced by a chain and drive. A separate directing unit preferably comprises two diabolos to enable the directing to be performed. A series of diabolos is thus obtained in such an embodiment, wherein products are placed alternatingly at the positions between the diabolos. It has been found that this realizes a stable processing of the products at a relatively high processing speed.

In a further advantageous preferred embodiment according to the present invention the packaging device comprises at least two directing units and an optimizer configured to determine an order of products to be picked up and/or a set-down position of picked-up products in a packaging or container.

The capacity of the packaging device can be further increased by providing a plurality of directing units at a manipulator. The optimizer can further in each case choose a product on one of the directing units to be picked up and to be the next product to be placed in a packaging or container. It is also possible to employ the optimizer for a system, optionally with only one directing unit, wherein the desired set-down position for the product being packaged at that moment can be selected. The optimizer can in this way for instance optimally distrubute or group products of equal size in a packaging or container. The same is also true for other product characteristics, including colour intensity of the product, product form and the like. This further optimizes for instance visual aspects of the packaging with directed products. Other quality aspects can also be optimized hereby. If desired, a plurality of directing units can be provided parallel and/or in series. The directing unit can also fulfil a transport function here by making use of a plurality of driven rollers, discs, diabolos or other suitable elements. Sampling and transport are hereby combined.

In a further advantageous preferred embodiment according to the invention a weighing cell is provided.

Providing one or more weighing cells makes it possible to achieve a precise filling of the packaging or container. The weighing cell can be provided for this purpose in the directing unit and/or in or on the pick-up element or manipulator and/or under the packaging or container. The intended final weight of the packaging is here realized as optimally as possible, and excess or short weight is avoided during packaging.

In a further embodiment according to the invention a packaging sensor is provided which is configured to detect a set-down position for the product.

Detecting a set-down position improves control over the packaging, particularly the setting down of the products. The sensor preferably detects the presence of a packaging, the number of set-down positions for the product, the availability of such a position and further preferably possible height differences and/or other irregularities. This increases the flexibility for handling packagings of different types and dimensions. In addition, this reduces the risk of product damage as a result of for instance height differences, and product damage such as bruising resulting therefrom. The packagings are for instance barrels, packing trays, platters and the like. Such a packaging sensor is for instance a stereo camera. After positioning of the product a control measurement is preferably performed by the same and/or a different sensor.

The invention further relates to a sorting system for sorting and directional packaging of products, such as vegetables and fruit, comprising:
 a sorting device for sorting products; and
 a packaging device, operatively connected to one or more sorting outlets of a sorting device, as described above.

Such a sorting system provides the same advantages and effects as stated for the packaging device. In the context of the present invention sorting system is also understood to mean a packaging device. Particularly in combination with an automated system can a great processing capacity for the products be provided, wherein damage to the product is avoided.

The invention further also relates to a method for directional packaging of products, such as vegetables and fruit, comprising the steps of:
 providing a packaging device as described above;
 supplying products;
 determining a collection of suitable pick-up points with a sensor system;
 directing a product with a directing unit such that at least one of the collection of suitable pick-up points is positioned in the pick-up range of a manipulator; and
 transferring the product picked up from the directing unit to a packaging or container using a manipulator, wherein the product is placed in the desired orientation by the manipulator.

Such a method provides the same advantages and effects as stated for the packaging device and/or the sorting system. The method can particularly provide an efficient packaging process for vulnerable products in particular, wherein products are placed in a packaging or container in directed manner. The reduction in the required packaging time can reduce packaging costs. The risk of damage to the product is also avoided with the method according to the invention. In the processing of products, such as apples, provided with a bloom and/or a stalk and/or a calyx, the products are in a currently preferred method oriented on the basis of a desired orientation of bloom and/or stalk and/or calyx in the packaging or container. A desired orientation of the products can be realized in this manner. It is thus for instance possible to have the stalks point in the same direction or to orient the bloom in a determined pattern, such as a checkerboard pattern. It will be apparent that diverse options are available by means of the directional packaging process according to the present invention. After directional packaging of the products in the packaging these products are transported further, for instance for further transport and storage.

In possible embodiments the method according to the present invention makes use of one or more steps or tasks as described above for the sensor system and/or the pick-up element. An effective packaging process is hereby achieved.

Figure 2:
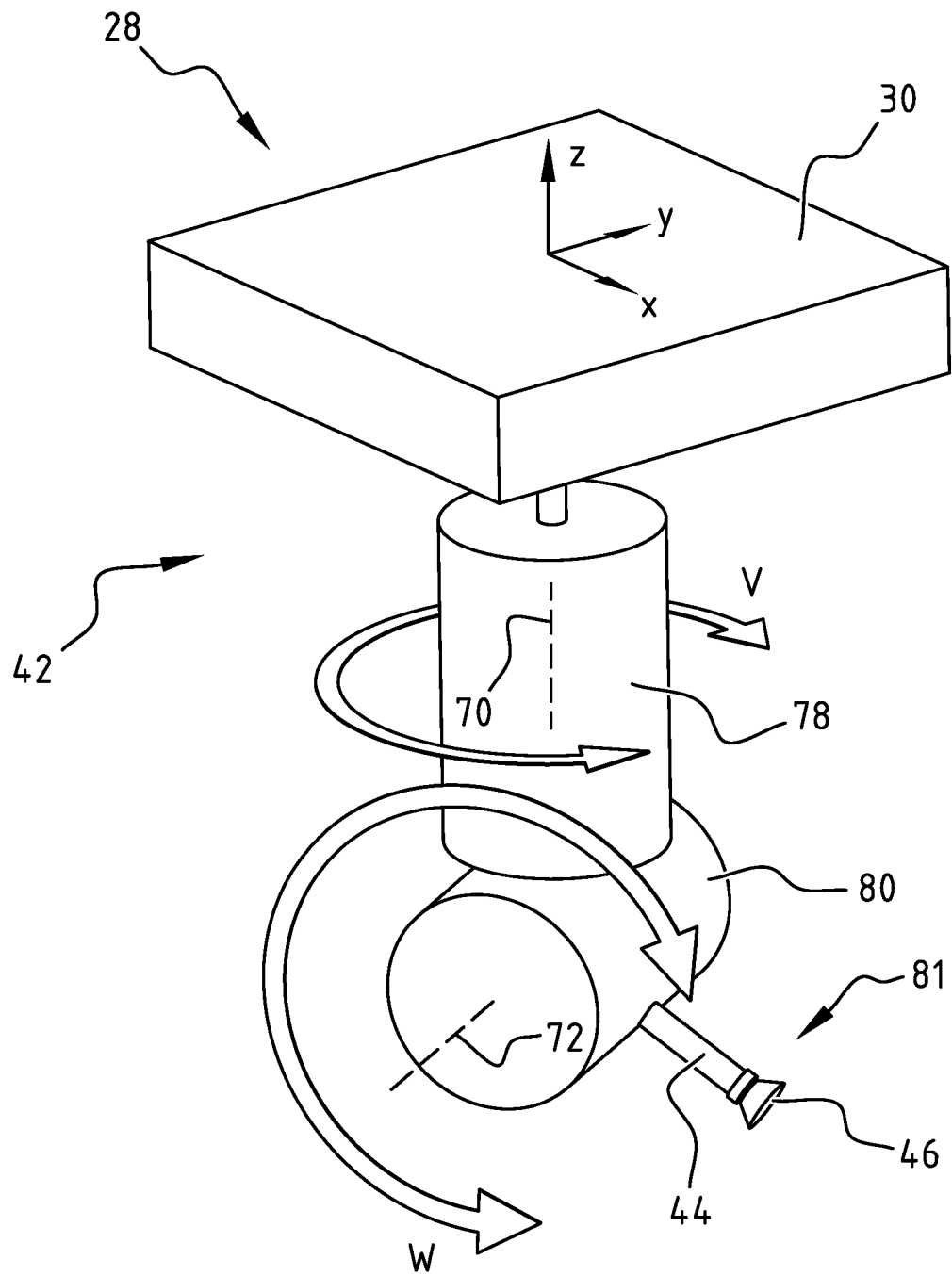
Figure 3:
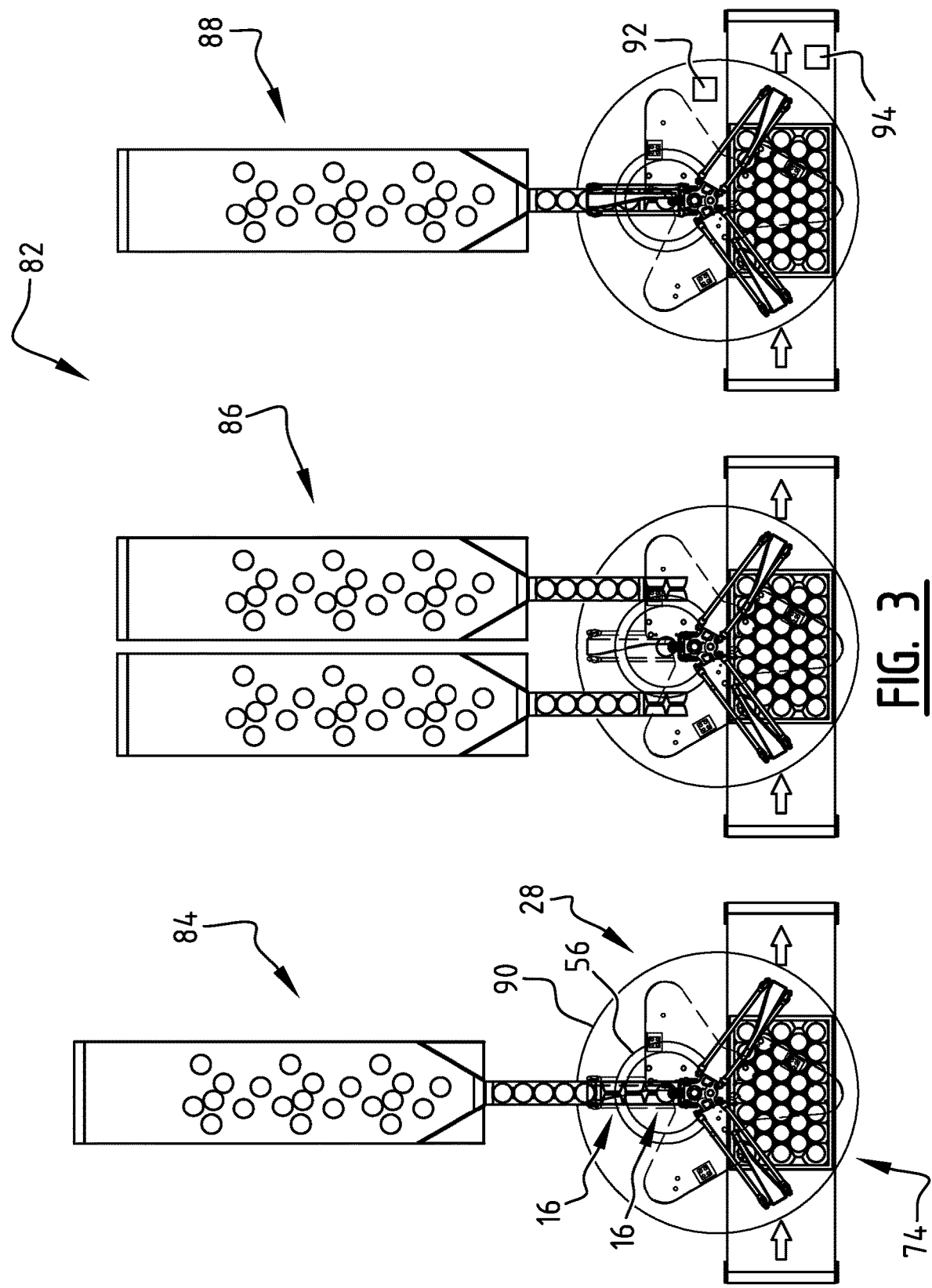
Figure 4:
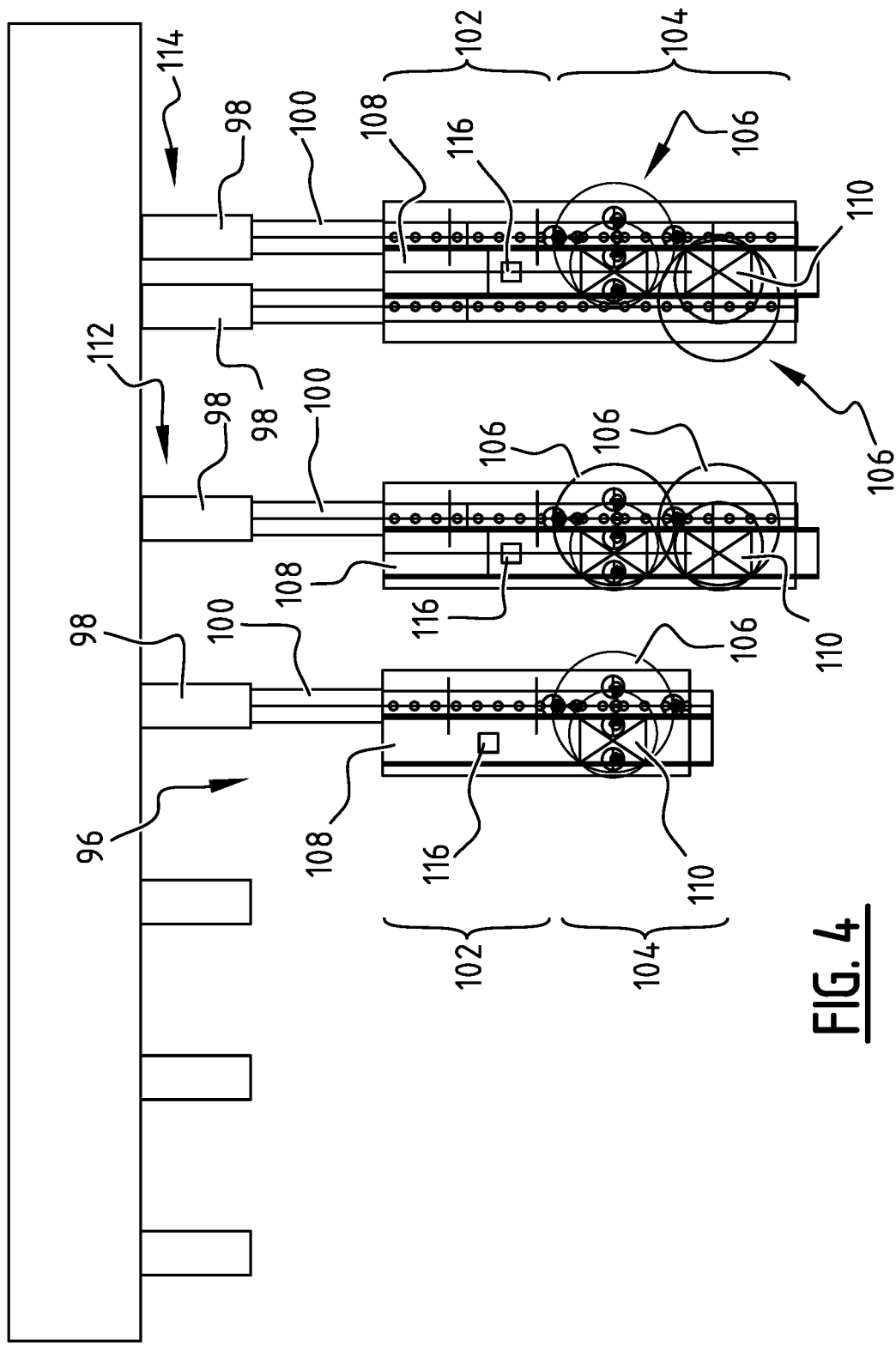
Figure 5A:
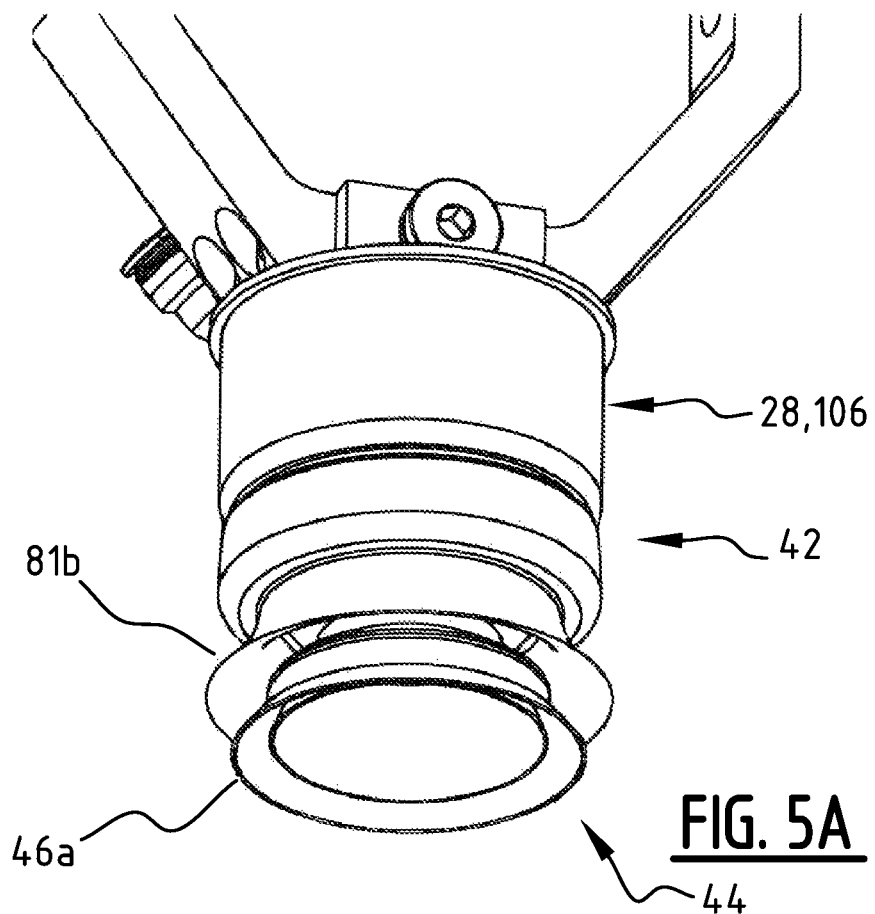
Figure 5B:
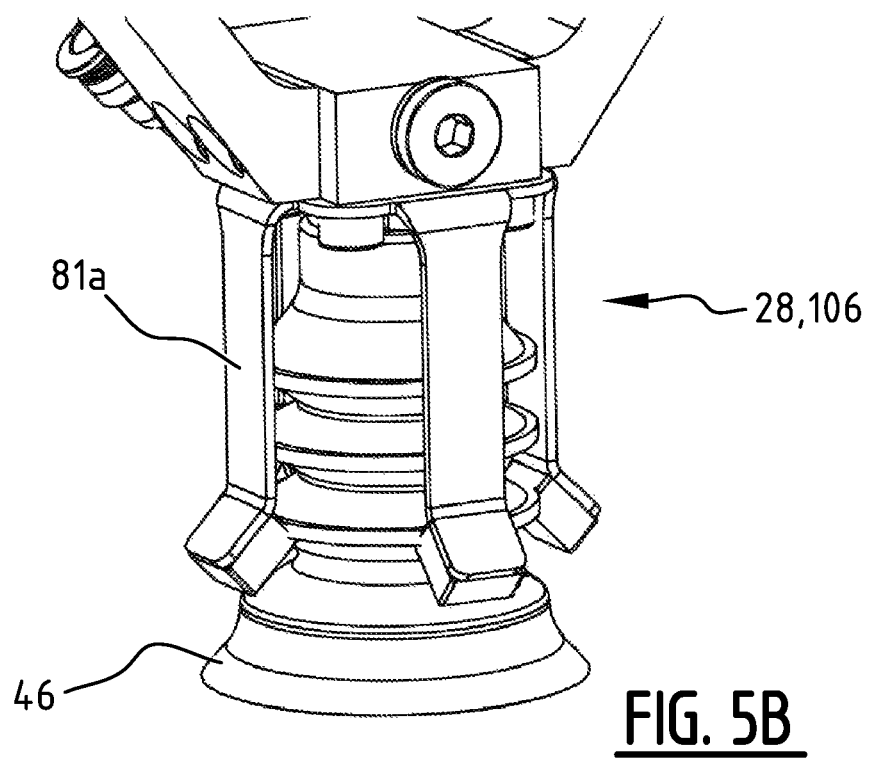

Multiple advantages, features and details of the invention are elucidated on the basis of preferred embodiments thereof, wherein reference is made to the accompanying drawings, in which:
 FIG. 1 shows a side view of a packaging line with a packaging device according to the invention;
 FIG. 2 shows a schematic view of the manipulator head of FIG. 1;
 FIG. 3 shows a view of a setup with three processing lines according to the invention;
 FIG. 4 shows a view of a setup with further processing lines according to the invention; and
 FIGS. 5A-B show a view of the head with stabilizer according to the invention.

Packaging line 2 (FIG. 1) supplies products P with conveyor belt 4. In the shown embodiment products P are provided with calyx 6 and bloom 8. At the outer end of conveyor belt 4 products P are transferred with guide 10 to belt 12, on which individual (buffer) positions 14 are arranged to transfer products in singulated state to directing unit 16. Directing unit 16 consists of two shafts 18, 20 with a rollers 22, 24 rotating therearound. The product P for directing is situated at directing position 26.

In the shown embodiment manipulator 28 is embodied with moving device 30 comprising three arms 32 which can move using one or more motors 34 and central control 36. Arms 32 are provided at the outer end with a rotation shaft 38 to which two parallel rods 40 are connected in the shown embodiment. Parallel rods 40 are connected with the other outer ends to head 42. Head 42 is provided with pick-up element 44 on which one or more suction cups 46 are arranged. In the shown embodiment head 42 is further provided with vacuum means 48. These means 48 can if desired also be provided at another desired location. Suction cup 46 is used to pick up products P at directing position 26. Manipulator 28 is embodied such that product P can be picked up in an operating range 50 of directing position 26. In the shown embodiment the upper hemisphere of a product P at directing position 26 lies substantially in operating range 50. In the shown embodiment suction cup 46 is further provided with sensor 52 for detecting for instance the pressure in suction cup 46.

In the shown embodiment product P is assessed at directing position 26 using camera 54, wherein use is made, among other factors, of the rotation of rollers 22, 24 of directing unit 16 in order to thereby enable the whole product to be viewed. Camera 54 is provided for this purpose with operating range 56 in which sampling can take place. In the shown embodiment sampling takes place at position 26. It will be apparent that operating range 56 of camera 54 can also be expanded to for instance belt 12 and/or belt 4 so as to already receive information about products P at an earlier stage. Camera 54 sends signal 58 to controller 60. Controller 60 determines the control signals 62 required for directing unit controller 64, which then sends control signals 66 to directing unit 16. Controller 60 further sends signals 68 to central control 36 of moving device 30, after which one or more motors 34 are controlled. It will be apparent that other configurations for the control are also possible, for instance with one central controller or conversely with even more local controllers.

Manipulator 28 moves with moving device 30 in a three-dimensional X-Y-Z space. Head 42 is rotatable around rotation axis 70 and rotation axis 72 for pick-up element 44. A product P is picked up at position A by manipulator 28 and carried via transfer position B to positioning position C, where products P are placed in a packaging 74 with head 42. Product P is here placed at a desired position in packaging 74 with the correct orientation, for instance with a desired orientation of bloom 8 and/or calyx 6. Packaging 74 is supplied with conveyor belt 76. In the shown embodiment it is possible to adjust conveyor belt 76 in height direction.

Manipulator head 42 can be moved in a three-dimensional X-Y-Z space with the schematically shown moving device 30 (FIG. 2). A first rotating device 78 is movable in a rotation direction V around rotation axis 70. Second rotating device 80 to which pick-up element 44 with suction cup 46 is connected is movable around rotation axis 72. Manipulator 42 is shown schematically in FIG. 2, this indicating the movement in directions V, W, X, Y, Z. Such a manipulator 28 thereby has five degrees of freedom and is able to grip or pick up products P at a desired position, to orient them and to place them with a desired orientation in a packaging 74. Physical stabilizer 81 provides a further stabilization of product P in suction cup 46 and relieves suction cup 46 during displacement of product P. Manipulator head 42 can optionally be provided with more than one suction cup 46. In the shown embodiment suction cup 46 is modular, which means that it can be exchanged or replaced quickly, for instance for the purpose of processing a different product type and/or damage. Manipulator 28 can optionally be used to position packaging 74 and/or a so-called packing tray. If desired, manipulator 28 can also be used to arrange a label or to wrap in a foil, paper, wrapper and the like.

Product P which has to be packaged in packaging 74 is supplied via conveyor belt 4 and carried to belt 12 with individual (buffer) positions 14. As soon as directing unit 16 is ready to receive product P belt 12 moves in order to deliver product P onto directing unit 16. It will be apparent that other systems can also be applied to deliver product P onto directing unit 16. It is possible to envisage here a non-directional supply in trays with a so-called tray packer, product P being placed on directing unit 16 with manipulator 28 and then being picked up again after measuring/directing and being placed in a packaging in directional manner. As further alternative, belt 12 and/or belt 4 can be brought at least partially into operating range 56, such that camera 54 can already sample products P on belt 12 and/or belt 4. Should a manipulator 28 be able to reach a product P with a suitable pick-up point, product P can be picked up directly and directing unit 16 can as it were be skipped for this product P.

Product P is rotated on directing unit 16 such that a quality assessment of product P can preferably be carried out with camera 54 and/or other sensors, wherein orientation of product characteristics such as calyx 6 and/or bloom 8 and/or stalk can also be determined. A collection of suitable pick-up points on the surface of product P is then determined by controller 60 on the basis of signals 58 coming from camera 54. Using directing unit 16 at least one of these pick-up points from the collection of suitable pick-up points is then brought into pick-up range 50, this corresponding to operating range 50 of manipulator 28 in the shown embodiment. In the shown embodiment this pick-up range 50 corresponds to the upper hemisphere of product P. It will be apparent that other configurations of ranges with a different manipulator are likewise possible according to the invention. Manipulator 28 picks product P up from directing position 26 using suction cup 46. It will be apparent that other pick-up systems such as grippers can also be applied here instead of suction cup 46. Manipulator 28 is then moved to packaging 74, which is supplied via a conveyor belt 76. Product P is here oriented in a desired position and so placed in packaging 74. After packaging 74 has been filled with products P which have been placed in a desired orientation using manipulator 28, a preferably filled packaging 74 is discharged for further processing and a new packaging 74 is placed. Supply and discharge of packagings 74 can be performed in a horizontal, vertical or combined plane. Packaging 74 can if desired be placed at an angle to the horizontal plane here. If desired, it is possible to have packaging 74 co-displace during filling in order to further accelerate the packaging process. Packaging 74 can also be placed on a turntable in order to further increase the movement possibilities. Packagings 74 are for instance boxes, packing trays, barrels, and can be filled with a single layer or a plurality of layers.

Directing unit 16 is optionally provided with a rotation mechanism around a substantially vertical axis. A rotation can thereby be performed in the case that a suitable pick-up point of product P is for instance situated on the side of directing unit 16. This avoids manipulator 28 blocking operating range 56 of camera 54 and/or other sensors.

Directing unit 16 is further optionally embodied with a plurality of rollers or discs 22, 24 which are placed one behind the other. Directing unit 16 hereby also fulfils the transport function of belt 12. By advancing products P over or by means of combined directing unit 16 and also sampling them, at a determined moment a suitable pick-up point comes to lie such that it can be picked up with manipulator 28 for directional placing in packaging 74. Discs or rollers 22, 24 are driven here. Instead of such a combined supply and directing with rollers or discs 22, 24, it is also possible as further alternative to make use of diabolos to perform this combination. An effective packaging process is hereby possible.

In a shown embodiment (FIG. 3) a complete packaging system and/or sorting system 82 comprises three packaging lines 84, 86, 88. In the shown embodiment packaging lines 84, 86, 88 show a number of possible variants. It will be apparent that a different number and/or more packaging lines of the same type of embodiment can be used in practice. Packaging lines 84, 86, 88 comprise similar elements as the above discussed packaging line 2 as shown in FIG. 1. Each packaging line 84, 86, 88 is provided with a manipulator 28 which has an operating range 90. Products are sampled in one or more operating ranges 56 and transferred to packaging 74. In a possible embodiment directing unit 16 is provided with additional guide 91 (FIG. 1) whereby directing unit 16 can be displaced to a position outside operating range 56 of camera 54. This enables picking up with pick-up element 44 to be performed by manipulator 28 outside operating range 56 of camera 54, this without the two elements impeding each other.

In the shown embodiment packaging line 84 is provided with a double directing unit 16. Packaging line 86 is further provided with a second feed system. Both ways allow the overall capacity to be increased and/or a choice to be made between different products P to be the next product P to be placed in a packaging 74 using manipulator 28. It will be apparent that both providing a double supply line and providing a double directing unit 16 can also be combined in one single packaging line 2. In the shown embodiment packaging line 88 is provided with marker 92, for instance in the form of a laser whereby markings can be arranged on a product. Marker 92 can optionally be controlled by manipulator 28, or product P is carried through the operating range of marker 92 by the manipulator. If desired, marker 92 can additionally or alternatively be embodied as waxing station to provide products P with a wax layer in order to extend the shelf life of the product and/or also allowing product P to be better visually presented. Sensor 94 is additionally provided for detecting packaging 74 or parts thereof and/or for checking the position of products P. A correction thereof can optionally be performed with manipulator 28. Sensor 94 can likewise be applied to check the position of packaging 74 and/or check the filling of packaging 74. It is also possible to use sensor 94 for an additional check in order to see whether an intended set-down position is actually available. It is also possible to provide all packaging lines 2 with one or more of these aspects, or further aspects still.

Other configurations (FIG. 4) make use of for instance a packaging line 96 with supply 98, dosing unit 100, measuring and directing part 102, pick-up part 104 with manipulator/robot 106, and discharge belt, packaging belt or barrel belt 108 with packaging or tray 110. Alternative packaging line 112 makes use of the same or similar components, but is provided with a second manipulator/robot 106 placed in series. Placing two (or more) manipulators/robots 106 in series for supply line 98 enables an increase in processing speed. In further alternative packaging line 114 double supply 98 is provided with single discharge belt 108. It will be apparent that further alternative embodiments are likewise possible. It is also possible to apply different components. Sensor 116 can for instance be provided for detecting set-down positions and/or product positioning, for instance as a stereo camera. Additional sensor 94 can optionally also be provided as a further check.

Stabilizer 81*a* (FIG. 5B) with a number of finger-like elements and stabilizer 81*b* (FIG. 5A) with an annular form are alternative embodiments of stabilizer 81 arranged in or on pick-up element 44 of head 42 of manipulator 28 or manipulator/robot 106. In the shown embodiments element 44 is provided with suction cup 46. When a product is picked up suction cup 46 is as it were retracted so that the product finds support against stabilizer 81, 81*a*, 81*b*.

The present invention is by no means limited to the above described preferred embodiments thereof. The rights sought are defined by the following claims, within the scope of which further modifications can be envisaged. It is thus for instance possible to set up the packaging line in a substantially straight line. It will be apparent that other setups are also possible, for instance a setup in a U-shape. Manipulator 28 can also be provided at an angle in order to change the operating range of manipulator 28 and/or avoid overlap with operating range 56 of sensors 54. If desired, a plurality of manipulators 28 can be provided which take over products P from each other so as to position product P in packaging 74 in directional manner.

The invention claimed is:

1. A packaging device for directional packaging of products comprising:
   a sensor system configured to detect a collection of suitable pick-up points of a product for packaging;
   at least one directing unit operatively connected to the sensor system and configured to direct the product such that at least one suitable pick-up point lies in an operating range of a manipulator, and wherein the directing unit is provided with at least one degree of freedom for rotation of the product around a substantially horizontal rotation axis; and
   the manipulator, comprising:
   a pick-up element configured to pick the product up from the at least one directing unit; and
   a moving device, on or close to an outer end of which the pick-up element is arranged and which comprises at least four degrees of freedom for translation of the product and rotation around a substantially horizontal rotation axis,
   wherein a rotation of the product around a substantially vertical rotation axis is possible by providing the moving device with at least five degrees of freedom and/or by providing the at least one directing unit with a second degree of freedom, such that the moving device can pick up the product and place it in a packaging or a container in a desired orientation,
   wherein the sensor system comprises:
      a camera system and/or one or more other sensors, and
      a processing unit configured to process information obtained by the camera system and/or the one or more other sensors,
      wherein the processing unit is configured to determine a most suitable pick-up point of the collection of suitable pick-up points, and
      wherein a suitable pick-up point is a point on the product for which it has been determined by the processing unit that the manipulator can pick up the product for processing in a desired manner.

2. The packaging device of claim 1, wherein the sensor system includes the camera system.

3. The packaging device of claim 1, wherein the sensor system includes the one or more other sensors.

4. The packaging device of claim 1, wherein the sensor system is further configured to determine quality aspects of the product and, also with reference thereto, determine a subsequent processing step for the product.

5. The packaging device of claim 1, wherein the at least one directing unit is provided with one degree of freedom for directing the product, wherein the product can move around a substantially horizontal rotation axis, and wherein the moving device is provided with at least five degrees of freedom.

6. The packaging device of claim 1, wherein the at least one directing unit is provided with two degrees of freedom for directing the product, wherein the product can move around a substantially horizontal and a substantially vertical rotation axis, and wherein the moving device is provided with at least four degrees of freedom for translation of the product and rotation of the product around a substantially horizontal rotation axis.

7. The packaging device of claim 1, wherein the pick-up element is provided with a pressure means configured to provide an underpressure such that a product can be picked up.

8. The packaging device of claim 7, wherein the pick-up element is provided with a product detector configured to determine a grip of the pick-up element on the product.

9. The packaging device of claim 7, wherein the pick-up element is provided with a mechanical gripper mechanism.

10. The packaging device of claim 9, wherein the pick-up element is further provided with a stabilizing element configured to additionally support the picked-up product during movement thereof with the pick-up element.

11. The packaging device of claim 10, wherein the stabilizing element comprises a stop element, and wherein the pressure means is able to move inward against the stop element when the product is being picked up.

12. The packaging device of claim 1, further comprising a displacing device for providing for a relative displacement between the sensor system and a pick-up position where the product can be picked up by the manipulator.

13. The packaging device of claim 12, wherein the displacing device comprises an endless series of directing units.

14. The packaging device of claim 1, further comprising at least two directing units and an optimizer configured to determine an order of products to be picked up and/or a set-down position of picked-up products in a packaging or a container.

15. The packaging device of claim 1, further comprising a weighing cell configured to measure a product weight.

16. The packaging device of claim 1, further comprising a packaging sensor configured to detect a set-down position for the product.

17. A sorting system for sorting and directional packaging of products, the sorting system comprising:
- a sorting device for sorting products; and
- a packaging device, operatively connected to one or more sorting outlets of the sorting device, the packaging device comprising;
  - a sensor system configured to detect a collection of suitable pick-up points of a product for packaging;
  - at least one directing unit operatively connected to the sensor system and configured to direct the product such that at least one suitable pick-up point lies in an operating range of a manipulator, and wherein the at least one directing unit is provided with at least one degree of freedom for rotation of the product around a substantially horizontal rotation axis; and
  - the manipulator, comprising:
    - a pick-up element configured to pick the product up from the at least one directing unit; and
    - a moving device, on or close to an outer end of which the pick-up element is arranged and which comprises at least four degrees of freedom for translation of the product and rotation around a substantially horizontal rotation axis,
  - wherein a rotation of the product around a substantially vertical rotation axis is possible by providing the moving device with at least five degrees of freedom and/or by providing the at least one directing unit with a second degree of freedom, such that the moving device can pick up the product and place it in a packaging or a container in a desired orientation,
  - wherein the sensor system comprises:
    - a camera system and/or one or more other sensors, and
    - a processing unit configured to process information obtained by the camera system and/or the one or more other sensors,
    - wherein the processing unit is configured to determine a most suitable pick-up point of the collection of suitable pick-up points, and
    - wherein a suitable pick-up point is a point on the product for which it has been determined by the processing unit that the manipulator can pick up the product for processing in a desired manner.

18. A method for directional packaging of products the method comprising:
- providing a packaging device, comprising;
  - a sensor system configured to detect a collection of suitable pick-up points of a product for packaging;
  - at least one directing unit operatively connected to the sensor system and configured to direct the product such that at least one suitable pick-up point lies in an operating range of a manipulator, and wherein the at least one directing unit is provided with at least one degree of freedom for rotation of the product around a substantially horizontal rotation axis; and
  - the manipulator, comprising:
    - a pick-up element configured to pick the product up from the at least one directing unit; and
    - a moving device, on or close to an outer end of which the pick-up element is arranged and which comprises at least four degrees of freedom for translation of the product and rotation around a substantially horizontal rotation axis,
  - wherein a rotation of the product around a substantially vertical rotation axis is possible by providing the moving device with at least five degrees of freedom and/or by providing the at least one directing unit with a second degree of freedom, such that the moving device can pick up the product and place it in a packaging or a container in a desired orientation,
  - wherein the sensor system comprises:
    - a camera system and/or one or more other sensors, and
    - a processing unit configured to process information obtained by the camera system and/or the one or more other sensors,
    - wherein the processing unit is configured to determine a most suitable pick-up point of the collection of suitable pick-up points, and
    - wherein a suitable pick-up point is a point on the product for which it has been determined by the processing unit that the manipulator can pick up the product for processing in a desired manner; and
- supplying products;
- determining the most suitable pick-up point of the collection of suitable pick-up points of the product using the processing unit;
- directing the product with the at least one directing unit such that the most suitable pick-up point is positioned in the operating range of the manipulator; and
- transferring the product picked up from the at least one directing unit to a packaging or a container using the manipulator, wherein the product is placed in a desired orientation by the manipulator.

19. The method of claim 18, wherein, during in the processing of products provided with a bloom and/or a stalk and/or a calyx, the products are oriented on the basis of a desired orientation of the bloom and/or the stalk and/or the calyx in the packaging or the container.

20. The packaging device of claim 1, wherein the pick-up element is provided with a product detector configured to determine a grip of the pick-up element on the product.

* * * * *